United States Patent
Malmberg et al.

[11] 3,983,257
[45] Sept. 28, 1976

[54] PRODUCTION OF MILK WITH PREDETERMINED FAT CONTENT

[75] Inventors: Rolf Malmberg, Lund; Lars Gustav Olenfalk, Jarfalla, both of Sweden

[73] Assignee: Alfa-Laval AB, Tumba, Sweden

[22] Filed: May 17, 1974

[21] Appl. No.: 470,864

[30] Foreign Application Priority Data
May 29, 1973  Sweden.............................. 7307559

[52] U.S. Cl................................ 426/231; 426/491
[51] Int. Cl.²............................................ A01K 43/00
[58] Field of Search .......... 426/491, 231, 150, 356, 426/580, 590; 137/625.28, 110; 73/196; 233/19, 21; 210/514, 515

[56] References Cited
UNITED STATES PATENTS

| | | | |
|---|---|---|---|
| 2,264,665 | 12/1941 | Hall | 426/491 |
| 2,567,898 | 9/1951 | Staaff | 426/231 |
| 2,603,568 | 7/1952 | Nelson | 426/491 |
| 2,752,815 | 7/1956 | Batchelor | 426/231 |
| 3,829,584 | 8/1974 | Seiberling | 426/231 |

Primary Examiner—Hiram H. Bernstein
Attorney, Agent, or Firm—Cyrus S. Hapgood

[57] ABSTRACT

Milk to be standardized is fed continuously to a centrifugal separator which discharges separate flows of skim milk and cream; and the density of the separated cream is maintained substantially constant by continuously measuring such density and using these density measurements to control one of the separate flows. Pipelines leading from these separate flows to a mixing zone are provided with meters for measuring the flow rates of the skim milk and cream, respectively; and a quotient controller operatively connected to the flow meters controls the flow through one of the pipelines to maintain the quotient of the respective flow rates substantially constant.

2 Claims, 1 Drawing Figure

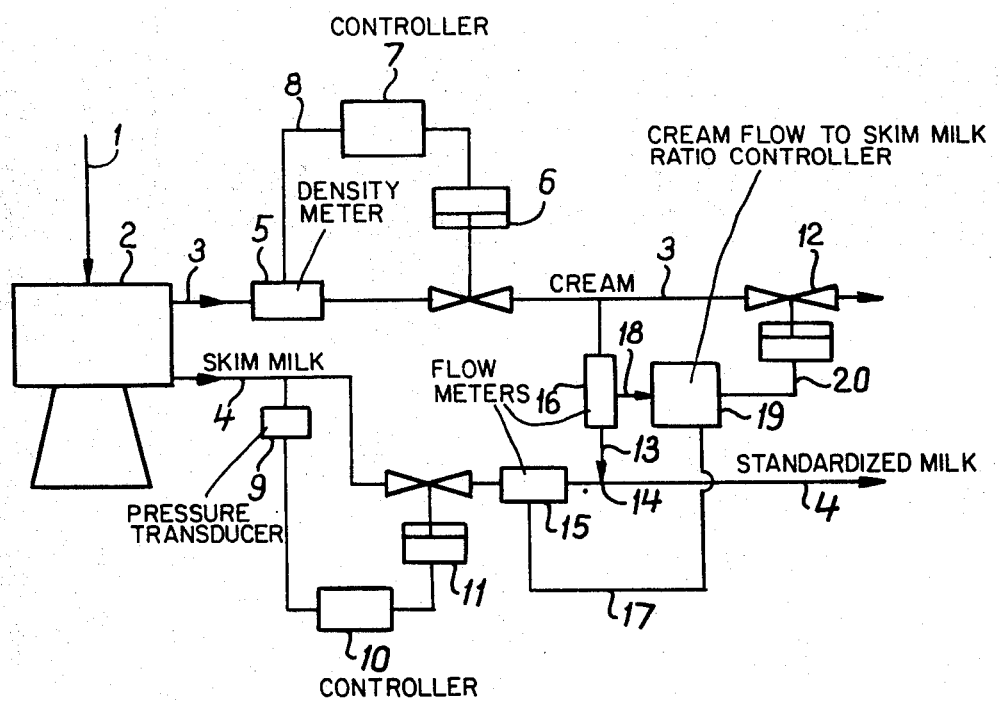

PRODUCTION OF MILK WITH PREDETERMINED FAT CONTENT

The present invention relates to a method and system for continuous production of milk with a predetermined fat percentage, so-called standardized milk.

When producing standardized milk, it is desired to obtain a predetermined fat percentage in the finished milk. Due to lack of accuracy in the production methods, it is necessary to have a certain fat excess in the finished milk, this excess corresponding to the margin of error with which it is necessary to operate, thereby insuring that the actual fat percentage will not be lower than the predetermined fat percentage. By the present invention, an automatic control of the fat percentage is obtained; and compared with conventional manual control of the fat percentage, it is possible to make a fat gain of the magnitude of 0.1 percent, calculated on the milk quantity. This means that in a dairy with a throughput of 100,000 kg of milk per day, the fat gain will be 0.1 percent of 100,000 kg or 100 kg of fat per day. Furthermore, control and fat percentage analyses will require less work; and as distinguished from other methods, the fat percentage of the whole milk can be allowed to vary during the operation without it being necessary to take any corrective steps.

More exactly, the method according to the invention is characterized in that milk with a certain fat percentage, such as whole milk, is subjected to centrifugal separation, skim milk and cream leaving the separator as two different flows; that the density of the discharging cream is continuously measured; that the measurement impulses are caused to control one of said two flows, preferably the cream flow, in such a way that the density of the cream is kept constant; that flows of skim milk and cream for re-mixing are measured; and that the quotient of the two flow measurement values is kept constant, whereby changes in the one flow are caused to change the other flow in a corresponding way.

Since normally the fat percentage of the milk supplied to the centrifugal separator and the fat percentage of the standardized milk are not equal, an excess of either cream or skim milk is obtained if one of these products is completely consumed for the production of standardized milk. This excess is discharged to a separate collection tank. When starting from whole milk, usually an excess of cream is obtained, since normally the standardized milk has a lower fat percentage than the whole milk. The cream can be kept at a constant fat percentage, such as 40 percent. However, it is obvious that it is possible to derive from the present method, in addition to standardized milk, skim milk and cream as well.

The invention also comprises a system for carrying out the present method and which is characterized by a continuously operating centrifugal separator with two outlets, one for heavy and the other for light liquid component, a continuously operating density meter inserted in the outlet for light liquid component, a flow control means inserted in one of the outlets, a measurement value-transmitting connection with a controller between the density meter and the flow control means, pipelines leading to a mixing place for the two components, a flow meter inserted in each of these pipelines, and measurement value-transmitting connections between the flow meters and a quotient controller arranged to control the flow through one of the pipelines leading to the mixing place.

The invention is described more in detail below, reference being made to the accompanying drawing in which the single illustration is a schematic view of an example of a system for carrying out the present method.

In the drawing, the system comprises a pipeline 1 for supplying whole milk, for example, to a centrifugal separator 2. From the latter and under pressure, cream is fed out through a pipeline 3 and skim milk through a pipeline 4. A density meter 5 for the cream and a controllable throttling valve 6 are inserted in the pipeline 3. In a practical embodiment, the signal from the density meter 5 is transmitted via a controller 7 to the throttling valve 6 by electric or pneumatic means. This measurement value transmission is designated at 8. The control circuit so constituted keeps the density of the cream constant and thereby indirectly also keeps the fat percentage of the cream constant. The desired fat percentage (density) of the cream, such as 40 percent, is adjusted by means of the controller. In the skim milk pipeline 4 there is inserted a control circuit consisting of a pressure transducer 9, a controller 10 and a throttling valve 11. The pressure in the skim milk outlet of the centrifuge can be kept constant by means of this control circuit. Thus, the density meter will operate within a desirably narrow pressure range. An additional controllable throttling valve 12 is inserted in the cream pipeline 3. A shunt pipeline 13 connects the pipelines 3 and 4 while leading to a mixing place 14 for skim milk and cream. Flow meters 15 and 16 are inserted in the respective pipelines 4 and 13. The flow meter 15 can just as well be inserted in the pipeline 4 after the mixing place 14. There are measurement value-transmitting connections 17 and 18 leading from the respective flow meters to a quotient controller 19, which senses the mutual relation between the measurement values of the flow meters and with the guidance of this relation adjusts the controllable throttling valve 12 by means of an impulse-transmitting connection 20. This means that if the cream flow through the pipeline 13 is too small to ensure the predetermined fat percentage of the standardized milk leaving the pipeline 4, the valve 12 is throttled still more. Thus, the cream flow through the pipeline 13 increases so that the fat percentage of the milk leaving the pipeline 4 increases to the predetermined value.

Before the system is placed into full operation, a first run of the system is made, the different measuring devices being calibrated so that an accurate fat analysis of the cream and the standardized milk leaving the system shows the desired fat percentage. Thereafter the system is put into full operation and functions by itself without manual control steps.

By means of the quotient controller, the fat percentage of the standardized milk can be adjusted, for example, between 3.0 and 0.5 percent.

We claim:

1. A method for continuous production of milk with a predetermined fat content, which comprises subjecting milk to a centrifugal separating step, discharging separate flows of skim milk and cream from said separating step, continuously measuring the density of said discharging cream to provide measurement impulses, maintaining the density of the discharging cream substantially constant by causing said measurement impulses to control one of said separate flows, separately and continuously measuring flows of said skim milk and cream to provide respective flow measurement values, maintaining the quotient of said flow measurement values substantially constant whereby changes in one of said flows are caused to change the other flow in a corresponding manner, and re-mixing said measured flows of skim milk and cream.

2. The method of claim 1, in which said measurement impulses are caused to control the separate cream flow.

* * * * *